United States Patent [19]

Rogers et al.

[11] Patent Number: 5,187,028
[45] Date of Patent: Feb. 16, 1993

[54] NICKEL-HYDROGEN CELLS

[75] Inventors: Howard H. Rogers, Torrance; Richard P. Sernka, Long Beach; Steven J. Stadnick, Lakewood, all of Calif.

[73] Assignee: Hughes Aircraft Company, Los Angeles, Calif.

[21] Appl. No.: 843,345

[22] Filed: Feb. 28, 1992

[51] Int. Cl.$^5$ .................................... H01M 10/34
[52] U.S. Cl. .................................... 429/101; 429/152
[58] Field of Search ............ 429/101, 27, 206, 152, 429/154

[56] References Cited

U.S. PATENT DOCUMENTS

| | | | |
|---|---|---|---|
| 4,584,249 | 4/1986 | Smithrick | 429/101 X |
| 4,820,597 | 4/1989 | Lim et al. | 429/27 X |
| 5,030,524 | 7/1991 | Stadnick | 429/101 X |
| 5,059,496 | 10/1991 | Sindorf | 429/101 |
| 5,077,149 | 12/1991 | Ikoma et al. | 429/101 |

Primary Examiner—Anthony Skapars
Attorney, Agent, or Firm—Terje Gudmestad; W. K. Denson-Low

[57] ABSTRACT

Improved nickel-hydrogen batteries (10) are disclosed, wherein the improvement provides for wettable porous polypropylene cloth gas diffusion screens (12) to separate the individual cells (16) thereof. When necessary, substantially all of the electrolyte may be readily drained from the cells (16) of the batteries (10). Wettability is achieved by oxidizing the surfaces of the cloth gas diffusion screens (12) prior to assembling them in the batteries (10).

19 Claims, 3 Drawing Sheets

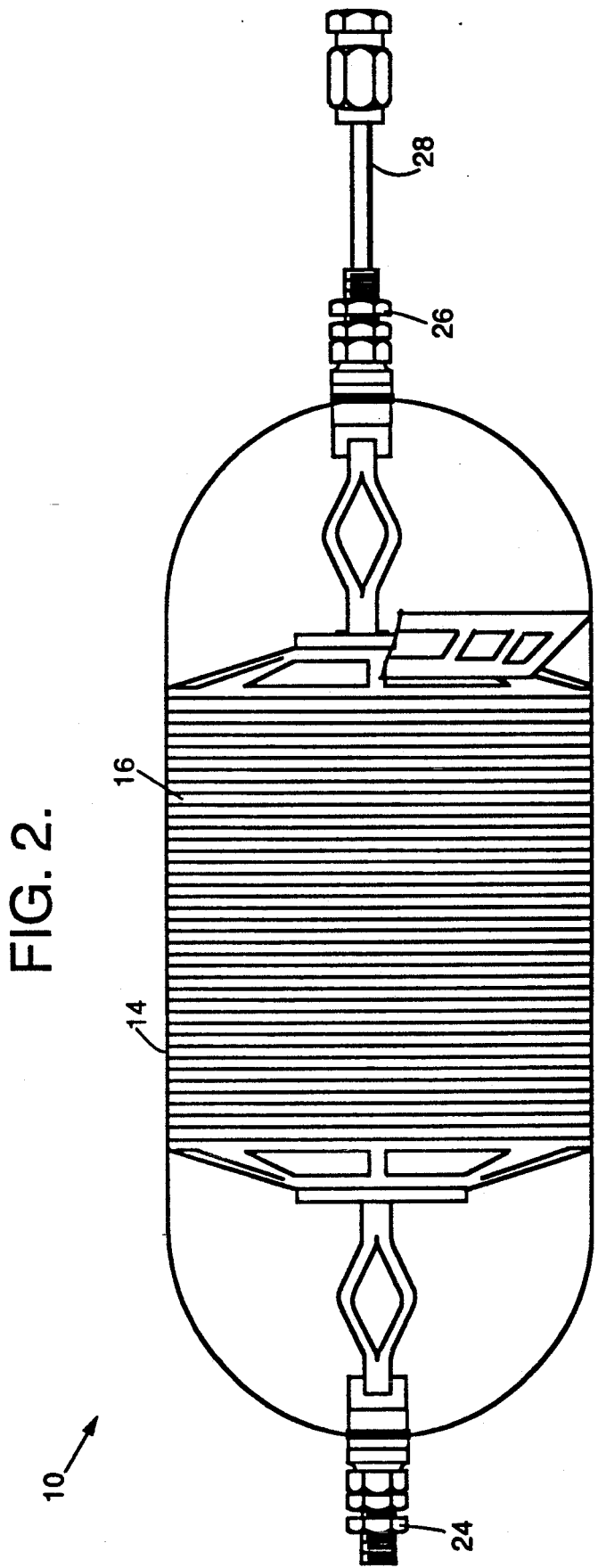

NICKEL-HYDROGEN CELLS

BACKGROUND

The present invention relates generally to nickel-hydrogen batteries, and more particularly, to nickel-hydrogen batteries having wettable porous gas diffusion screens inserted during the fabrication process.

Nickel-hydrogen batteries typically comprise a multiplicity of individual cells stacked "back-to-back" during manufacture. In at least one commercially available design, each of these cells comprises a plurality of nickel oxide and teflon-platinum hydrogen electrode elements in a sufficient number to form a cell stack. Each of the cell stacks is separated from those adjacent on either side by a porous gas diffusion screen. In use, the cell stacks are filled with an alkaline electrolyte by a commonly used vacuum procedure. In batteries produced today, inherently hydrophobic polypropylene gas diffusion screens are typically employed and, in use, it is found that these hydrophobic gas diffusion screens tend to trap electrolyte within them. Further, when the batteries must be drained during manufacture, it is found that these gas screens also tend to retain some amount of the electrolyte because there is simply no wettable path out of the screens, even when pressurized hydrogen gas is forced through their interior. This retained electrolyte contributes to the uneven distribution of oxygen gas during overcharge, especially when the batteries are cycled horizontally on earth or in spinner-type spacecraft. This uneven oxygen distribution has led to a problem known as "edge popping" which comprises an explosive reaction of hydrogen and oxygen within a cell. This can result in a destruction of the edge of the stack and partial shorting of the battery cell. In addition, this retained electrolyte leads to blockage and uneven distribution of hydrogen gas pressure within the battery, thus further contributing to degraded performance of the battery.

SUMMARY OF THE INVENTION

The present invention is primarily concerned with nickel-hydrogen batteries particularly those having an internal structure known as "back-to-back" cell stacking. This "back-to-back" cell configuration is advantageous because it employs fewer components and produces lighter weight and smaller batteries than those produced with conventional recirculating designs. The use of porous cloth gas screens, as in the present invention, reduces problems with edge popping, as observed in conventional designs, by treating the polypropylene or other plastic gas screens in a manner that makes them wettable with respect to the cell electrolyte.

Two methods are available for making wettable gas screens for use in nickel-hydrogen batteries. In the first of these methods, the surfaces of the plastic screen are treated with an aqueous sulfuric acid solution of one or more soluble alkali chromates or dichromates to oxidize the surface of the screens. Alternatively, an aqueous alkali permanganate solution and sulfuric acid may be used. In the second method, a low pressure plasma or corona discharge in an inert gas is used to modify the surfaces of the screens so as to provide a wettable surface. Regardless of the particular surface treatment method used, once the screens are treated, the electrode stacks are then assembled in a conventional manner with no changes in the procedures used for conventional stacking or cell activation.

When either of these methods is used, it is found that the gas screens become wettable by the electrolyte, thus allowing the electrolyte to first readily creep or flow along the surfaces of the stack to the edges thereof and then out of the stack when it is drained. Therefore, a nickel-hydrogen battery having cell stacks incorporating wettable gas screens as in the present invention inherently retains less electrolyte and has a more even gas distribution, thereby reducing the problems of edge popping and cell degradation.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which

FIG. 2 is a cross-sectional view of a battery incorporating the present invention;

DETAILED DESCRIPTION

Figure 1:
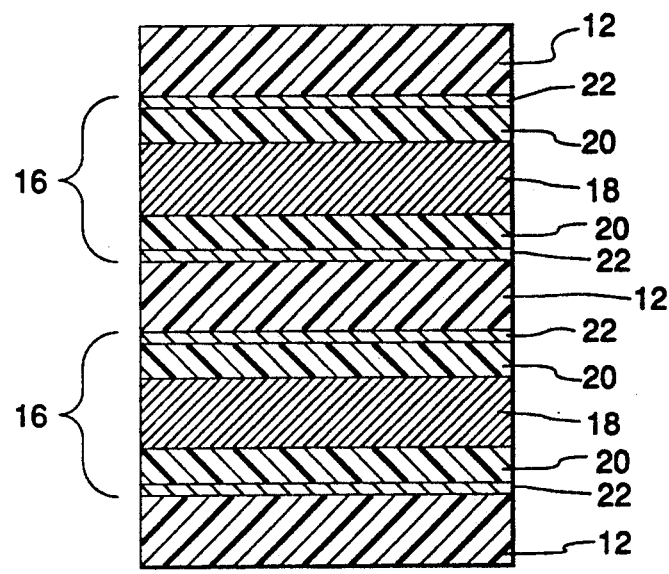
FIG. 1 shows an exemplary nickel-hydrogen battery having a back-to-back cell design and incorporating a wettable gas diffusion screen.

Referring to FIGS. 1 and 2, an exemplary nickel-hydrogen battery 10 of the present invention is shown, the battery having a back-to-back cell design, the design incorporating wettable gas diffusion screens 12. The nickel-hydrogen battery 10 further comprises a housing 14 having an external length of between about 10 and about 16 inches and an internal diameter of between about 3.4 and about 4.5 inches. Within this housing 14 is disposed a plurality of individual battery cells 16.

As shown particularly in FIG. 1, each of these cells 16 comprises a central nickel oxide electrode element 18 having a thickness of between about 0.020 and about 0.070 inches. Typically, each of these elements 18 is first surrounded on the top and bottom surfaces thereof by a pair of zirconium oxide cloth (zircar) separators 20, the separators having a thickness between about 0.005 and about 0.030 inches, and then by a pair of teflon-platinum hydrogen electrode elements 22 having a thickness between about 0.004 and about 0.012 inches.

In a cell stack having a "back to back" type of construction, each of the cells 16 is separated from adjacent cells by a plastic cloth gas diffusion screen 12, the screen preferably being made of polypropylene cloth. Typically, the cloth will have a mesh opening between about 200 and about 600 microns, a thickness between about 400 and about 700 microns, and a fabric weight between about 3.0 and about 7.0 oz per square yard.

Figure 3B:
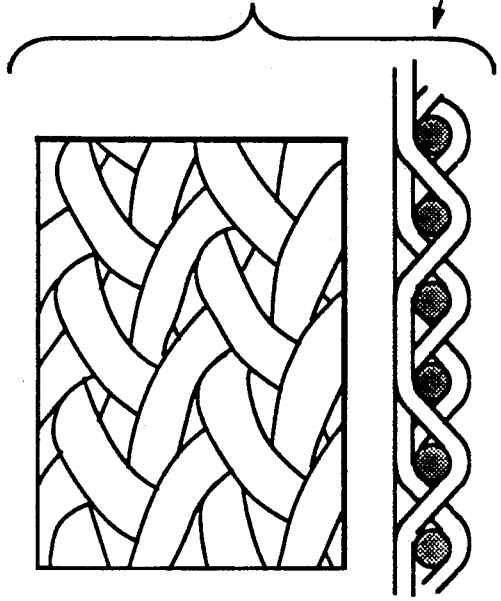
FIG. 3a-d is an enlarged plan view of typical cloth gas diffusion screen fabrics as used in the batteries of FIG. 1 and FIG. 2.
Figure 3D:
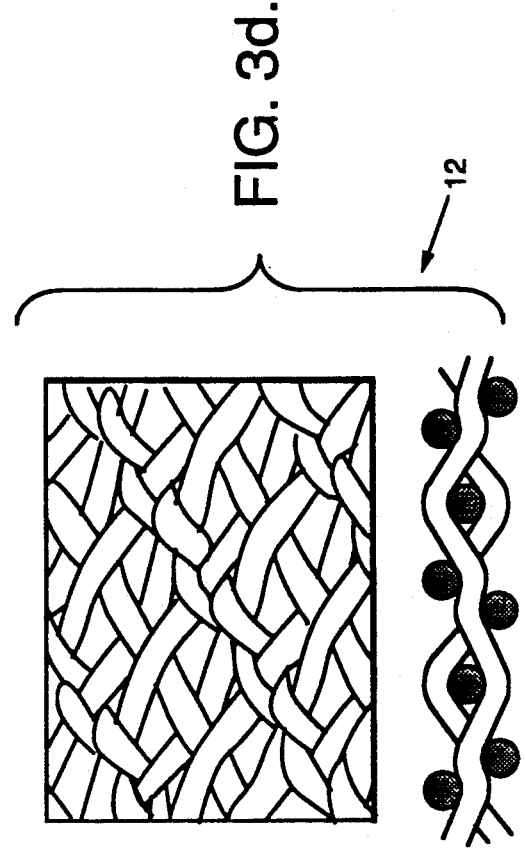
Figure 3A:
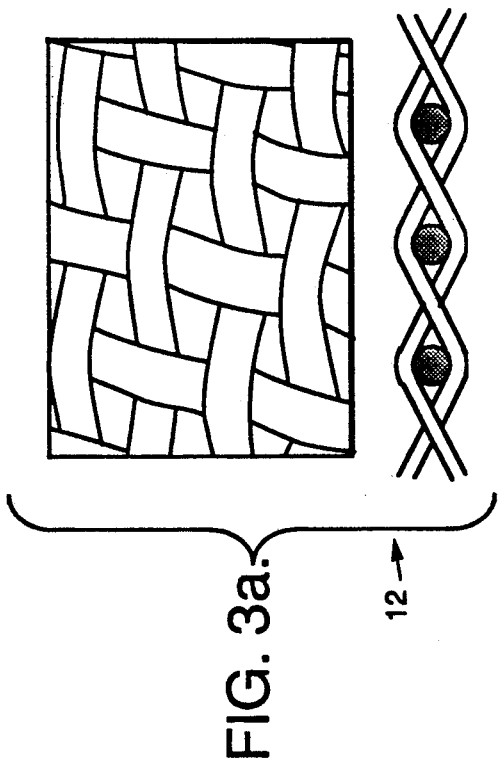
Figure 3C:
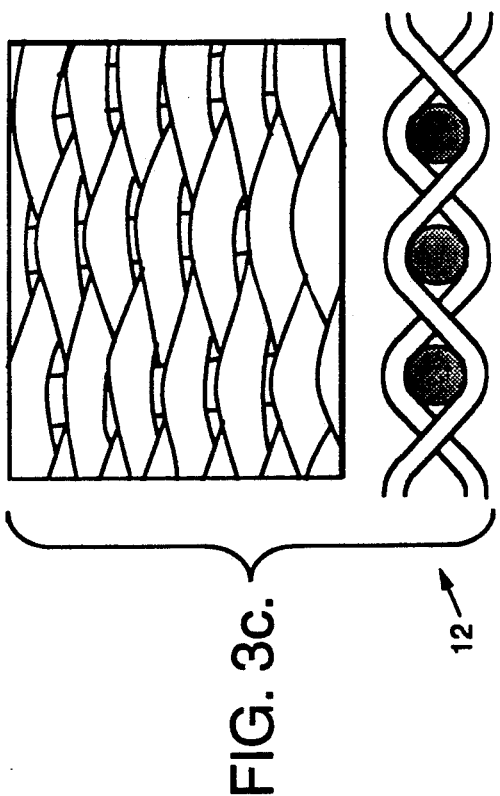

Suitable fabrics can be made from a number of different polymeric materials including polyethylene, nylon, flurocarbon polymers and polypropylene and may come with a variety of weave patterns. As shown in FIGS. 3a to 3d, these weaves include square weaves (3a), twill weaves (3b), PRD (Plan Reversed Dutch) weaves (3c) and special taffeta weaves (3d). Preferably and most generally used is a cloth having a square weave structure, as illustrated in FIG. 3a.

After final assembly, the space within the housing 14 surrounding the plurality of cells 16 is filled with an aqueous alkaline solution and then drained. Suitable for this purpose are solutions of sodium and potassium hydroxide. Preferred, and most commonly used, is a solution of potassium hydroxide having a concentration between about 20 and about 35 percent. In its final configuration, a typical 80 watt-hour battery with gas diffusion screens made non-wettable weigh between about 3 and 4 pounds, of which about approximately ⅛ is retained electrolyte.

As shown more particularly in FIG. 2, the battery 10 of the present invention further comprises positive and negative electrodes 24 and 26, typically one at each end, and a fill port 28, which is used to first fill and then drain the electrolyte from the interior of the battery 10. The manufacture and construction of the battery 10, and the procedures and methods for filling and draining it are well known in the art and need not be described in detail herein.

As noted above, the conventional polypropylene cloth gas diffusion screens 12 are inherently hydrophobic and during draining operations will, if not treated as will be described herein below, tend to trap at least some of the alkaline electrolyte within them because there is no wettable path out of them, even when pressurized hydrogen gas is forced through them. However, with the wettable screens 12 as used in the present invention, the drainage problem is substantially, if not entirely eliminated.

In a first embodiment of the present invention, the polypropylene cloth gas diffusion screens 12 are first treated with an aqueous solution comprising one or more soluble alkali chromates or dichromates, typically sodium or potassium dichromate, in concentrated sulfuric acid to oxidize the surfaces of the cloth screen. After treatment, polar groups including hydroxyl groups, carbonyl, carboxylic acid and sulfonic acid groups have all been identified in the surface regions of the fabric. Increasing the time and temperature of the etching process does not significantly change the degree of surface oxidation, but rather increases the depth to which oxidation occurs. Without wishing to be bound thereby, it is believed that it is the combination of the surface polar groups and the somewhat increased surface roughness resulting from the acid treatment which causes the screens 12 to be wettable with respect to the alkaline battery electrolyte solution. Other very strong oxidizing agents which may also be employed to cause the screens 12 to become wettable include aqueous alkali permanganate solutions acidified with sulfuric acid.

In a second procedure, a low pressure plasma discharge in a gas is used to treat the surfaces of the cloth screens 12 so as to make them wettable. The procedure for doing this is well known in the art. See, for example, the article "Corona Chemistry" in Scientific American 212, (6), 90 (1965.) Basically, in this process, the fabric is exposed to a corona discharge, usually in air and at atmospheric pressure which both introduces unsaturated C=C double bonds and carbonyl groups into the surfaces and roughens the surface somewhat. Recent studies have shown that with polypropylene, the polar component of the surface energy increases rapidly with this treatment, whereas the nonpolar component is essentially unchanged.

The chemical etchants specified with regard to the first embodiment are suitable for use with polyethylene and polypropylene. These particular etchants do not work with fluorocarbon polymers and attack nylon severely. The plasma method works with all polymeric screen materials under the right conditions. Nylon is somewhat wettable as may be employed as a permanently wettable screen except that it is very slowly attacked by cell electrolyte. Polybenzimidazole (PBI), configured as a screen, may also be employed as a permanently wettable screen since it is wettable and is resistant to the electrolyte.

As noted hereinabove, in manufacturing a battery 10 containing porous cloth gas diffusion screens 12 as prepared by either of these methods, to separate the individual cells 16 therein, the stacks are normally assembled with no changes in conventional cell stacking and construction or battery activation procedures. When a battery 10 is constructed with wettable gas diffusion screens 12, as prepared by either of the two methods described, edge popping will be substantially reduced. As a result, the longterm degradation frequently observed when these batteries are used in satellites is also significantly reduced. Furthermore, as a consequence of the more complete removal of residual electrolyte permitted when porous gas screens 12 are incorporated into the structure of a battery, a weight savings of between about 0.15 and about 0.20 pounds per battery is readily achievable. This can amount to as much as a 5.3 pound reduction in a typical spacecraft weight utilizing these batteries. Since current spacecraft launch costs are on the order of about $30,000/pound, a potential savings of about $160,000/launch may be achieved using the batteries 10 of the present invention.

Figure 4:
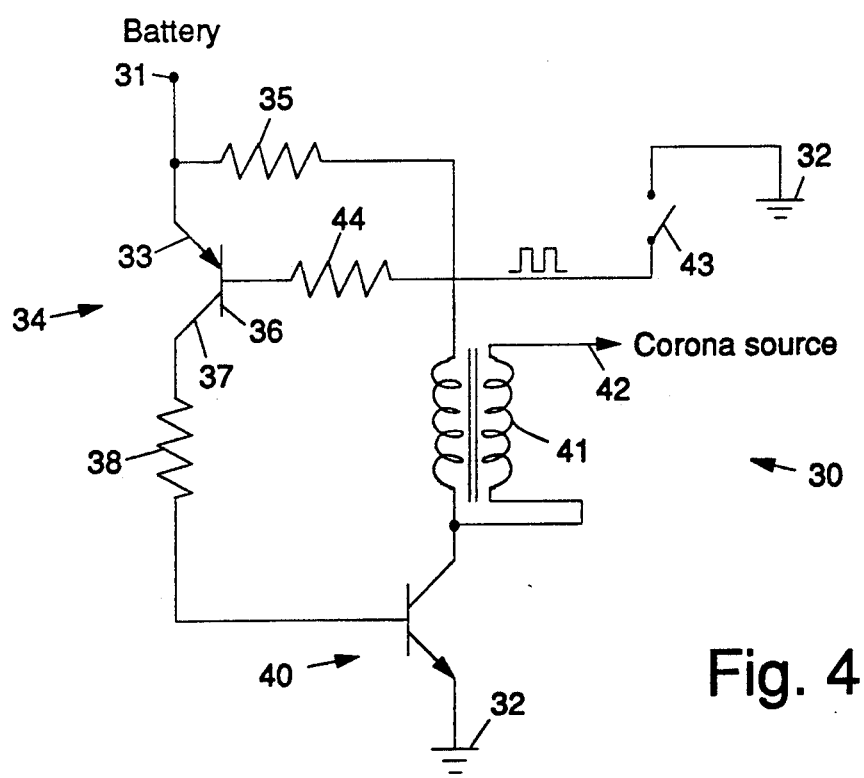
FIG. 4 is a circuit diagram for an exemplary corona discharge generator as used in conjunction with the present invention.

With reference to FIG. 4, it shows a simplified circuit diagram for an exemplary corona discharge generator as used as an electronic ignition system 30 that may be employed to energize a battery 10 in accordance with the present invention. For completeness of this description, a description of this ignition system 30 is presented below. The electronic ignition system 30 has a +12.5 volt input terminal 31 that is connected to a battery and a ground terminal 32. The +12.5 volt input terminal 31 is coupled to the emitter 33 of a first transistor 34 (Q1) and through a first resistor 35 (R2) to the base 36 of the first transistor 34. The first resistor 35 is used to set the drive current for the ignition system 30. The collector 37 of the first transistor 34 is coupled through a second resistor 38 (R1) to the base of a second transistor 40 (Q2). The output of the second transistor 40 is coupled to an ignition coil 41 and both are serially coupled between the +12.5 volt input terminal 31 and ground. The ignition coil 41 is controlled by the output of the second transistor 40, and its output drives a corona source 42.

An interrupter 43 (distributor) is coupled by way of a third resistor 44 (R3) between the ground terminal 32 and the base 36 of the first transistor 34. The interrupter 43 is adapted to provide a 50 percent duty cycle operating at approximately 380 pulses per second. The interrupter 43 may be a conventional mechanical or equivalent electronic mechanism, for example.

The following circuit elements make up the above described ignition system. The first transistor 34 (Q1) is a 2N6111 transistor; the second transistor 40 (Q2) is a MJ3040 transistor; the first resistor 35 (R1) is an 18 ohm 20 Watt resistor; the second resistor 38 (R2) is an 68 ohm ½ Watt resistor; the third resistor 44 (R3) is an 33 ohm 10 Watt resistor.

EXAMPLE

A semicircular area, 1.4 cm high by a 1.3 cm wide was marked with a felt tip marker at the edge of an approximately 10 cm diameter polypropylene gas screen (0.625 cm thick). This marked area was placed on an aluminum disc which was located about 0.9 cm beneath a pointed #18 iron-nickel wire. The wire was energized by an electronic ignition system, as shown in FIG. 4, operating with a standard Delco automotive ignition coil having a primary inductance of about 6.6 mH at a pulse repetition rate of about 380 pulses per second. The duty cycle was approximately 50%. The regulated power supply voltage was adjusted so that the maximum output voltage from the ignition coil secondary was obtained without sparking. The input to the coil was 1.2 A at 12.5 V. The screen was exposed to the resultant corona discharge for about 5 minutes on each side. At the conclusion of the treatment, no change in the surface appearance of the polypropylene gas screen was apparent.

The gas screen fabric was then immersed in water sufficient to cover both the treated and untreated areas and agitated to remove any trapped air present. On removal from the water, the screen remained saturated with water. Next, the screen was placed horizontally on a flat tetrafluroethylene (TFE) Teflon surface and a dry paper towel was placed against the edge of the untreated portion for about 2 minutes. It was observed that in this portion water was absorbed only from the area directly in contact with the paper. When the procedure was repeated with the towel being placed against the edge of the treated area, the water was entirely removed therefrom, apparently by capillary action.

Thus there has been described new and improved nickel-hydrogen batteries. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A nickel-hydrogen battery that is adapted to permit drainage of excess electrolyte therefrom, said battery comprising:
   a housing, said housing having at least two individual cells therein, each of said cells having
   a nickel electrode;
   a hydrogen electrode; and
   a separator disposed between the nickel and hydrogen electrodes;
   said battery further comprising a porous plastic cloth gas diffusion screen situated between said cells so as to separate them, said screen having been treated to make the surfaces thereof wettable; and
   electrolyte disposed within the housing surrounding the nickel and hydrogen electrodes, the separator and the porous plastic cloth gas diffusion screen.

2. The battery of claim 1 wherein said porous plastic cloth gas diffusion screen is a polymeric fabric selected from the group consisting of polyethylene, nylon, flurocarbon polymer and polypropylene cloth.

3. The battery of claim 2 wherein said polymeric fabric has a weave pattern selected from the group consisting of square weaves, twill weaves, plain reversed dutch weaves and special taffeta weaves.

4. The battery of claim 2 wherein said polymeric fabric is polypropylene.

5. The battery of claim 3 wherein said polymeric fabric has a square weave.

6. The battery of claim 3 wherein said polymeric fabric is made from polypropylene and has a square weave.

7. The battery of claim 1 wherein said porous plastic cloth gas diffusion screen has a mesh opening between about 200 and about 600 microns, a thickness between about 400 and about 700 microns, and a fabric weight between about 3.0 and about 7.0 oz per square yard.

8. The battery of claim 2 wherein said porous plastic cloth gas diffusion screen has a mesh opening between about 200 and about 600 microns, a thickness between about 400 and about 700 microns, and a fabric weight between about 3.0 and about 7.0 oz per square yard.

9. The battery of claim 6 wherein said polymeric fabric has a mesh opening between about 200 and about 600 microns, a thickness between about 400 and about 700 microns, and a fabric weight between about 3.0 and about 7.0 oz per square yard.

10. The battery of claim 3 wherein said polymeric fabric has a mesh opening between about 200 and about 600 microns, a thickness between about 400 and about 700 microns, and a fabric weight between about 3.0 and about 7.0 oz per square yard.

11. The battery of claim 1 wherein the surfaces of the porous plastic cloth gas diffusion screen are treated with a solution of one or more oxidizing agents selected from the group consisting of soluble alkali chromates, dichromates and permanganates in sulfuric acid to oxidize the surfaces of the screen and make them wettable with respect to the electrolyte solution.

12. The battery of claim 1 wherein the surfaces of the porous plastic cloth gas diffusion screen are treated with a solution of an oxidizing agent selected from the group consisting of soluble alkali chromates, dichromates and permanganates in sulfuric acid to oxidize the surfaces of the screen and make them wettable with respect to the electrolyte solution.

13. The battery of claim 1 wherein the surfaces of the porous plastic cloth gas diffusion screen are oxidized by exposing said surfaces to a plasma discharge while said porous plastic cloth gas diffusion screen is disposed in a gas to make the surfaces wettable with respect to the electrolyte.

14. A nickel-hydrogen battery that is adapted to permit drainage of excess electrolyte therefrom, said battery comprising:
   a housing; said housing having at least two "back-to-back" cells therein, each of said cells having
   a nickel electrode;
   a hydrogen electrode;
   a separator disposed between the nickel and hydrogen electrodes;
   a porous polypropylene cloth gas diffusion screen situated between said two cells so as to separate them, said screen having been treated with a solution of potassium chromate to oxidize the surfaces thereof so as to make them wettable; and
   electrolyte disposed within the housing surrounding the nickel and hydrogen electrodes, the separator and the porous plastic cloth gas diffusion screen.

15. The battery of claim 14 wherein said porous plastic cloth gas diffusion screen has a square weave.

16. The battery of claim 15 wherein said porous plastic cloth gas diffusion screen has a mesh opening between about 200 and about 600 microns, a thickness between about 400 and about 700 microns, and a fabric weight between about 3.0 and about 7.0 oz per square yard.

17. A nickel-hydrogen battery that is adapted to permit drainage of excess electrolyte therefrom, said battery comprising:
   a housing; said housing having at least two "back-to-back" cells therein, each of said cells having
   a nickel electrode;
   a hydrogen electrode;
   a separator disposed between the nickel and hydrogen electrodes;
   a porous polypropylene cloth gas diffusion screen situated between said two cells so as to separate them, said screen having been oxidized by exposing the surfaces thereof to a plasma discharge while they are disposed in an inert gas to oxidize the surfaces thereof so as to make them wettable; and
   electrolyte disposed within the housing surrounding the nickel and hydrogen electrodes, the separator and the porous plastic cloth gas diffusion screen.

18. The battery of claim 17 wherein said porous plastic cloth gas diffusion screen has a square weave.

19. The battery of claim 17 wherein said porous plastic cloth gas diffusion screen has a mesh opening between about 200 and about 600 microns, a thickness between about 400 and about 700 microns, and a fabric weight between about 3.0 and about 7.0 oz per square yard.

* * * * *